US012708146B2

(12) United States Patent
Wu et al.

(10) Patent No.: US 12,708,146 B2
(45) Date of Patent: Aug. 18, 2026

(54) SUSCEPTOR FOR AEROSOL GENERATION DEVICE AND AEROSOL GENERATION DEVICE

(71) Applicant: SHENZHEN FIRST UNION TECHNOLOGY CO., LTD., Shenzhen Guangdong Province (CN)

(72) Inventors: Tao Wu, Shenzhen Guangdong Province (CN); Huanjie He, Shenzhen Guangdong Province (CN); Junhui Li, Shenzhen Guangdong Province (CN); Hanliang Chen, Shenzhen Guangdong Province (CN); Baoling Lei, Shenzhen Guangdong Province (CN); Zuqiang Qi, Shenzhen Guangdong Province (CN); Zhongli Xu, Shenzhen Guangdong Province (CN); Yonghai Li, Shenzhen Guangdong Province (CN)

(73) Assignee: SHENZHEN FIRST UNION TECHNOLOGY CO., LTD., Shenzhen (CN)

( * ) Notice: Subject to any disclaimer, the term of this patent is extended or adjusted under 35 U.S.C. 154(b) by 595 days.

(21) Appl. No.: 17/757,011

(22) PCT Filed: Dec. 9, 2020

(86) PCT No.: PCT/CN2020/134983
§ 371 (c)(1),
(2) Date: Jun. 8, 2022

(87) PCT Pub. No.: WO2021/115339
PCT Pub. Date: Jun. 17, 2021

(65) Prior Publication Data

US 2023/0346030 A1 Nov. 2, 2023

(30) Foreign Application Priority Data

Dec. 9, 2019 (CN) ......................... 201922190772.7
Jan. 3, 2020 (CN) ......................... 202010007108.9

(51) Int. Cl.
*A24F 40/465* (2020.01)
*A24F 40/20* (2020.01)
(Continued)

(52) U.S. Cl.
CPC ............ *A24F 40/465* (2020.01); *A24F 40/20* (2020.01); *A24F 40/51* (2020.01); *H05B 6/105* (2013.01)

(58) Field of Classification Search
CPC ......... A24F 40/465; A24F 40/20; A24F 40/51
See application file for complete search history.

(56) References Cited

U.S. PATENT DOCUMENTS

2018/0192701 A1* 7/2018 Stoner ............... A61M 15/0025
2019/0182909 A1 6/2019 Fursa et al.

FOREIGN PATENT DOCUMENTS

CA 3089863 A1 8/2019
CN 108835716 A 11/2018
(Continued)

OTHER PUBLICATIONS

Machine tranlation of CN110169594 (Year: 2024).*
Machine translation of CN110477461 (Year: 2024).*

*Primary Examiner* — Michael H. Wilson
*Assistant Examiner* — Jennifer A Kessie
(74) *Attorney, Agent, or Firm* — PROI Intellectual Property US

(57) ABSTRACT

An aerosol generation device comprises a susceptor configured to be penetrated by a varying magnetic field to generate heat, so as to heat a smokable material; a circuit; and a temperature sensor comprising a sensing portion packaged
(Continued)

or accommodated within the susceptor, and an electrical connection portion connected to the sensing portion and at least partially located outside the susceptor. The circuit is electrically connected to the electrical connection portion, so that the temperature sensed by the sensing portion can be received by the electrical connection portion. In the aerosol generation device, the temperature sensor is packaged or accommodated within the susceptor, the effect of a magnetic field on the sensing portion can be substantially isolated, and the susceptor and the temperature sensor can be integrated into one piece, improving the stability of installation and the accuracy of temperature measurement, and also facilitating replacement and installation as a whole.

19 Claims, 8 Drawing Sheets

(51) Int. Cl.
*A24F 40/51* (2020.01)
*H05B 6/10* (2006.01)

(56) References Cited

FOREIGN PATENT DOCUMENTS

| | | | |
|---|---|---|---|
| CN | 109640716 | A | 4/2019 |
| CN | 110169594 | A | 8/2019 |
| CN | 209219269 | U | 8/2019 |
| CN | 209449669 | U | 10/2019 |
| CN | 110477461 | A | 11/2019 |
| EP | 3357359 | A2 | 4/2019 |
| EP | 3469936 | A2 | 4/2019 |
| WO | 2019129553 | A1 | 7/2019 |

* cited by examiner

SUSCEPTOR FOR AEROSOL GENERATION DEVICE AND AEROSOL GENERATION DEVICE

CROSS REFERENCE TO RELATED APPLICATION(S)

This application claims priorities to Chinese Patent Application No. 2019221907727, entitled "Susceptor for aerosol generation device and aerosol generation device" and submitted to China National Intellectual Property Administration on Dec. 9, 2019, the partial content of which is incorporated herein by reference, and No. 2020100071089, entitled "Susceptor for aerosol generation device and aerosol generation device" and submitted to China National Intellectual Property Administration on Jan. 3, 2020, the entire content of which is incorporated herein by reference.

TECHNICAL FIELD

The embodiment of the present disclosure relates to the technical field of heating and nonburning smoking sets, and in particular to a susceptor for an aerosol generation device and an aerosol generation device.

BACKGROUND

Tobacco products (e.g., cigarettes, cigars, etc.) are burning tobaccos to produce tobacco smoke during use. People attempt to make products that release compounds without burning so as to replace the tobacco products burning tobaccos.

An example of this kind of products is a heating device, which heats rather than burns a material to release compounds, for example, the material may be a tobacco product or other non-tobacco products which may contain or not contain nicotine. As another example, the existing technology provides a heating device of electromagnetic induction heating type, whose structure can refer to FIG. 1. When a tobacco product 1 is received inside a heating device, a susceptor 2 is penetrated by an alternating magnetic field generated by an induction coil 3 to generate heat under induction, thereby heating the tobacco product 1. During the process of heating, in order to monitor in real time the temperature to heat the tobacco product 1, the heating device employs a temperature sensor 4 that is tightly held against the susceptor 2 to sense the real-time operating temperature of the susceptor 2, and adjusts the parameter of the alternating magnetic field generated by the induction coil 3 according to the result sensed by the temperature sensor 4, so that the susceptor 2 is kept within a proper range of heating temperature.

During the temperature detection implementation of the above temperature sensor 4, in one aspect, since the temperature sensor 4 itself generally is made of a thermistor metal material, it will generate heat under an alternating magnetic field; in another aspect, the temperature sensor 4 made of a metallic material and the susceptor 2 generate an induction current individually, which impacts the sensing signal output by the temperature sensor 4 and impacts the accuracy of the sensing signal.

SUMMARY

In order to solve the problem of accuracy of temperature monitoring of the aerosol generation device in existing technologies, the embodiment of the present disclosure provides a susceptor for an aerosol generation device and an aerosol generation device.

In view of the above, one embodiment of the present disclosure provides an aerosol generation device, configured to heat a smokable material to generate an aerosol, including:

- a chamber, which is configured to receive a smokable material;
- a magnetic field generator, which is configured to generate a varying magnetic field;
- a susceptor, which is configured to be penetrated by the varying magnetic field to generate heat, so as to heat the smokable material received in the chamber;
- a circuit;
- a temperature sensor, including:
- a sensing portion, which is packaged or accommodated within the susceptor and is configured to sense a temperature of the susceptor; and
- an electrical connection portion connected to the sensing portion, which is at least partially located outside the susceptor and is electrically connected to the circuit, and through which the circuit can receive the temperature sensed by the sensing portion.

In a more preferred embodiment, an accommodation space is formed inside the susceptor, and the sensing portion is packaged or accommodated within the accommodation space.

In a more preferred embodiment, the accommodation space is isolated from the varying magnetic field.

In a more preferred embodiment, the susceptor includes an opening defined on a surface thereof, and the sensing portion is packaged or accommodated within the accommodation space through the opening; the opening is deviated from the direction in which the varying magnetic field penetrates through the susceptor, so that the accommodation space is isolated from the varying magnetic field.

In a more preferred embodiment, the accommodation space is completely covered or enclosed by the surface of the susceptor, so that the accommodation space is isolated from the varying magnetic field.

In a more preferred embodiment, the aerosol generation device further includes an elastomer, which is configured to provide an elastic force, so that the sensing portion is stably packaged or accommodated within the accommodation space.

In a more preferred embodiment, the electrical connection portion includes an elongated conductive pin.

In a more preferred embodiment, the electrical connection portion includes an electrical contact or electrical contact piece formed or bonded onto the surface of the susceptor.

In a more preferred embodiment, the electrical contact is an electrical contact formed by printing, deposition or etching.

In a more preferred embodiment, the electrical contact is insulated from the susceptor.

In a more preferred embodiment, the aerosol generation device further includes a conductive mechanism, one end of which abuts against the electrical contact or electrical contact piece and the other end is electrically connected to the circuit, so that the electrical contact or electrical contact piece is electrically connected to the circuit.

In a more preferred embodiment, the conductive mechanism includes a conductive pogo pin.

In a more preferred embodiment, the susceptor includes a pin, needle or sheet like heating portion extending at least in part along an axial direction of the chamber, and a base portion connected to the heating portion;

the accommodation space is formed inside the base portion; and/or, the electrical contact or electrical contact piece is formed or bonded onto a surface of the base portion.

In a more preferred embodiment, the susceptor includes:

a tubular element, extending along the axial direction of the chamber, at least part of an inner space of the tubular element forming the accommodation space; the tubular element includes opposite first end and second end;

the first end is provided with a pinhead and is configured to be able to be inserted into the smokable material received in the chamber; and the electrical connection portion of the temperature sensor runs through the second end to outside of the susceptor from the accommodation space.

In a more preferred embodiment, the sensing portion of the temperature sensor is arranged close to the pinhead.

In a more preferred embodiment, the pinhead includes:

a connection portion, which is constructed as a cylindrical shape and is at least partially accommodated within the tubular element from the first end; and a conical portion, which is constructed as abutting onto the first end and decreases gradually in outer diameter along a direction away from the first end.

In a more preferred embodiment, the susceptor further includes:

a sheet like end cover, which is arranged on the second end of the tubular element and extends along a cross-sectional direction of the tubular element; and the sheet like end cover defines a perforation for the electrical connection portion of the temperature sensor to run through.

In a more preferred embodiment, the aerosol generation device further includes a tubular holder; inside the tubular holder is arranged a separation portion extending along a radial direction, and an inner space of the holder is separated, through the separation portion, into a first portion and a second portion which are located at two sides of the separation portion, wherein the first portion is configured as a chamber to receive a smokable material;

the tubular element of the susceptor runs to inside of the chamber from the second portion through a through hole on the separation portion; the sheet like end cover of the susceptor is accommodated within the second portion and abuts on the separation portion, so that the susceptor is kept fixed inside the holder.

In a more preferred embodiment, a fixing seat is further arranged inside the second portion, the fixing seat is configured to provide support for the sheet like end cover, so that the sheet like end cover abuts on the separation portion.

In a more preferred embodiment, the accommodation space is completely covered or enclosed by the pinhead, the tubular element and the sheet like end cover, so that the accommodation space is isolated from the varying magnetic field.

In a more preferred embodiment, the tubular element has an inner diameter of about 2.5 to 4 mm and a tube wall thickness of 0.15 to 0.3 mm, which is easy to process and obtain and is enough to accommodate the sensing portion of the temperature sensor. More preferably, the tube wall thickness of the tubular element 32*e* employs a lowest possible thickness easy to prepare, such as 0.15 mm, which is suitable for the heating effect of electromagnetic induction type heating.

The present disclosure further provides a susceptor for an aerosol generation device, the susceptor being configured to be penetrated by a varying magnetic field to generate heat, so as to heat a smokable material, wherein the susceptor includes: a metal main body penetrated by a varying magnetic field to generate heat; and a temperature sensor, including:

a sensing portion, which is packaged or accommodated within the metal main body and is configured to sense a temperature of the metal main body; and an electrical connection portion connected to the sensing portion, which is at least partially located outside the metal main body, and through which the temperature of the metal main body sensed by the sensing portion can be received.

In a more preferred embodiment, the electrical connection portion includes an electrical contact or electrical contact piece formed or bonded onto a surface of the metal main body.

In the aerosol generation device provided by the present disclosure, the temperature sensor is packaged or accommodated within the susceptor, the effect of a magnetic field on the sensing portion can be substantially isolated, and the susceptor and the temperature sensor can be integrated into one piece, improving the stability of installation and the accuracy of temperature measurement, and also facilitating replacement and installation as a whole.

BRIEF DESCRIPTION OF THE DRAWINGS

One or more embodiments are illustrated through the image(s) in corresponding drawing(s). These illustrations do not form restrictions to the embodiments. Elements in the drawings with a same reference number are expressed as similar elements, and the images in the drawings do not form restrictions unless otherwise stated.

DETAILED DESCRIPTION

For a better understanding, the present disclosure is described below in further detail in conjunction with accompanying drawings and specific embodiments.

Figure 1:
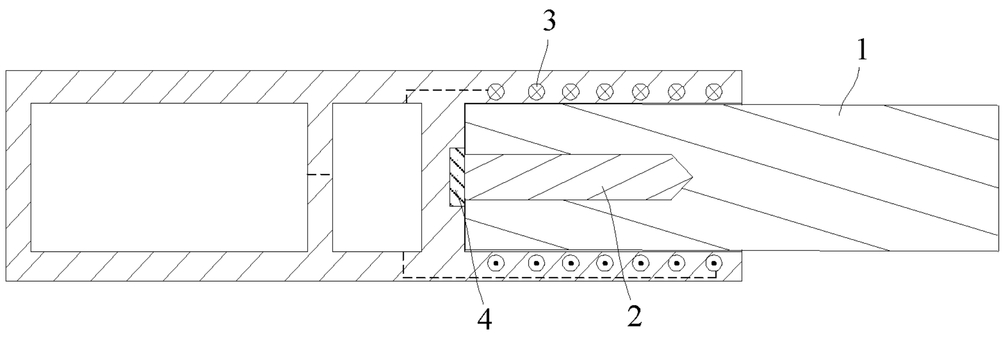
FIG. 1 is a structure diagram of an existing heating device of electromagnetic induction heating type.
Figure 2:
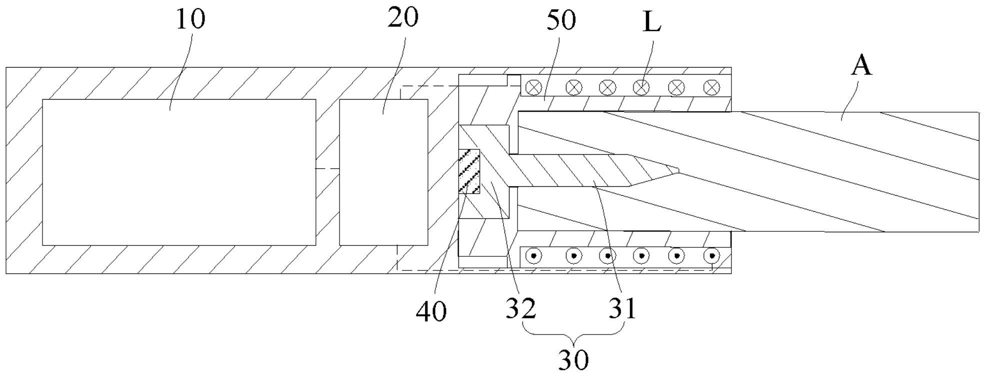
FIG. 2 is a structure diagram of an aerosol generation device according to one embodiment of the present disclosure.

One embodiment of the present disclosure provides an aerosol generation device, whose structure can refer to FIG. 2, including:

- a chamber, in which a smokable material A, for example, cigarette, is removably received;
- an induction coil L serving as a magnetic field generator, which is configured to generate an alternating magnetic field under an alternating current;
- a susceptor 30, which extends at least in part in the chamber and is configured to be inductively coupled with the induction coil L and to generate heat while being penetrated by the alternating magnetic field, thereby heating the smokable material A so that at least one composition of the smokable material A vaporizes to form an aerosol for inhalation;
- a battery cell 10, which is a rechargeable Direct Current (DC) battery cell and can supply DC voltage and DC current; and
- a circuit 20, which is electrically connected to the rechargeable battery cell 10 and converts the DC output from the battery cell 10 into an Alternating Current (AC) with an appropriate frequency and then supplies it to the induction coil L.

According to the usage setting of products, the induction coil L may include a cylindrical inductor coil wound in a spiral shape, as shown in FIG. 2. The cylindrical induction coil L wound in a spiral shape may have a radius ranged from about 5 mm to about 10 mm, in particular, the radius r may be about 7 mm. The cylindrical induction coil L wound in a spiral shape may have a length ranged from about 8 mm to about 14 mm, and the induction coil L has a number of windings ranged from about 8 windings to 15 windings. Correspondingly, the internal volume may be ranged from about 0.15 cm3 to about 1.10 cm3.

In a more preferred embodiment, the frequency of the alternating current supplied by the circuit 20 to the induction coil L is between 80 KHz and 400 KHz; more specifically, the frequency may be ranged from about 200 KHz to about 300 KHz.

In a preferred embodiment, the DC supply voltage supplied by the battery cell 10 is ranged from about 2.5V to about 9.0V, and the amperage of the DC supplied by the battery cell 10 is ranged from about 2.5 A to about 20 A.

In a preferred embodiment, the susceptor 30 shown in FIG. 2, presenting a sheet, needle or pin shape that can be inserted into the interior of the smokable material A to heat the smokable material, may have a length of about 12 mm, a width of about 4 mm and a thickness of about 50 um, and may be made of Grade 430 stainless steel (SS430). As an alternative embodiment, the susceptor 30 may have a length of about 12 mm, a width of about 5 mm and a thickness of about 50 μm, and may be made of Grade 430 stainless steel (SS430). In another preferred embodiment, the susceptor 30 may also be constructed as a cylindrical shape. During usage, the internal space is used for receiving the smokable material A and heating the periphery of the smokable material A to generate an aerosol for inhalation. These susceptors 30 may also be made of Grade 420 stainless steel (SS420) and alloy materials containing iron and nickel (for example, permalloy).

In the embodiment shown in FIG. 2, the aerosol generation device further includes a tubular holder 50 configured for holding the induction coil L and the susceptor 30; the material of the tubular holder 50 may include high temperature-resistant nonmetallic materials, for example, PEEK, or ceramic and the like. During implementation, the induction coil L is arranged on an outer wall of the tubular holder 50 in a spiral winding manner, and the tubular holder 50 is at least partially inside hollowed to form the chamber configured for receiving the smokable material A.

Meanwhile, based on making the temperature of the susceptor 30 to heat the smokable material A within a required proper temperature range, the aerosol generation device further includes a temperature sensor 40, which is packaged or accommodated and held within the susceptor 30 and is tightly pressed against the susceptor 30, and which senses in real time an operating temperature of the susceptor 30 and outputs a sensed temperature result.

Figure 3:
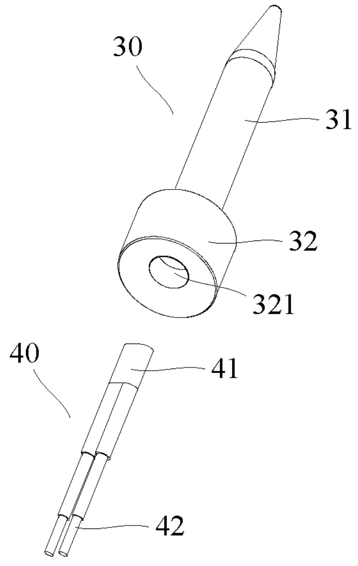
FIG. 3 is an exploded view of a susceptor and a temperature sensor shown in FIG. 2.
Figure 4:
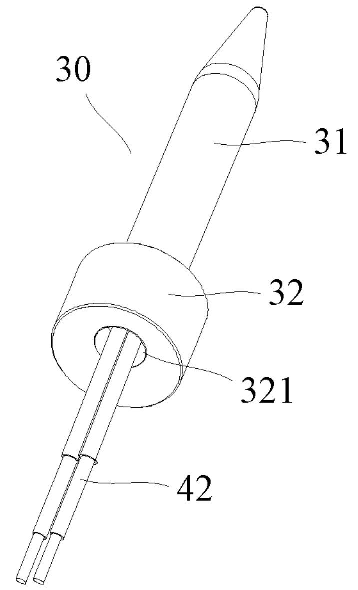
FIG. 4 is a diagram of a sensing portion of the temperature sensor shown in FIG. 3 being packaged within the susceptor.

In a more preferred embodiment, based on improving the accuracy of the temperature sensor 40 in sensing the temperature of the susceptor 30, the shape of the susceptor 30 and the structure of the temperature sensor 40 may further refer to FIG. 2 to FIG. 4; the susceptor 30 is adjusted in structure correspondingly, including a pin, needle or blade like heating portion 31 which extends within the chamber along the axial direction. When the smokable material A is received inside the chamber, the heating portion 31 can be inserted into the smokable material A to heat the interior of the smokable material A; meanwhile, the susceptor 30 further includes a base portion 32, which is larger than the heating portion 31 in size, for easy installation and fixing inside the tubular holder 50.

In more preferred embodiments shown in FIG. 3 and FIG. 4, the structure of the temperature sensor 40 includes a sensing portion 41 configured for sensing a temperature of the susceptor 30, and an elongated conductive pin 42 configured for supplying power to the sensing portion 41 and outputting a sensing result. The base portion 32 defines therein an accommodation space 321; the sensing portion 41 is accommodated and held within the accommodation space 321 and is tightly pressed against the base portion 32.

In the above embodiments, the susceptor 30 employs a magnetic conductive metallic material, which, when placed in a magnetic field, forms a magnetic shield, making the accommodation space 321 substantially a magnetically shielded or isolated space, thereby being capable of effectively preventing the sensing portion 41 made of a thermosensitive metallic material being impacted by a magnetic field during the temperature measurement process.

In order to make the temperature sensor 40 stably held within the accommodation space 321, in one embodiment a high-temperature glue may be applied after the temperature sensor 40 is tightly pressed against an inner wall of the accommodation space 321. Through the application of glue, the remaining gap is sealed, filled or padded.

Figure 5:
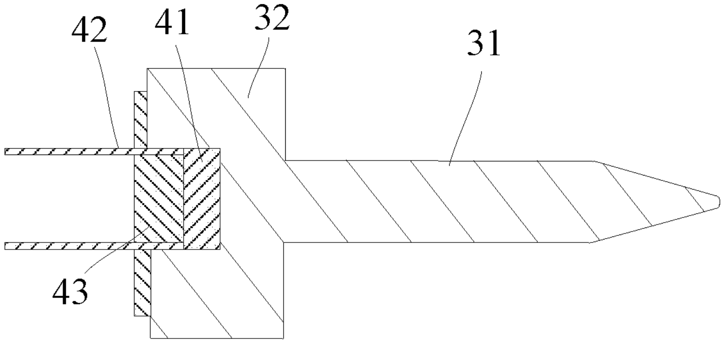
FIG. 5 is a diagram of a temperature sensor being stably packaged within a susceptor through an elastic plug according to another embodiment.

In another preferred embodiment, as shown in FIG. 5, an elastic plug 43 made of flexible materials such as silicone rubber can be added, to plug up the opening portion of the accommodation space 321 left after the placement of the sensing portion 41. By means of the elastic force of the elastic plug 43, the sensing portion 41 can be stably pressed against the inner wall of the accommodation space 321 all the time. Of course, according to the preferred embodiment shown in FIG. 5, the elastic plug 43 may reserve an aperture for the elongated conductive pin 42 to run through from the accommodation space 321 to electrically connect to the circuit 20.

Figure 6:
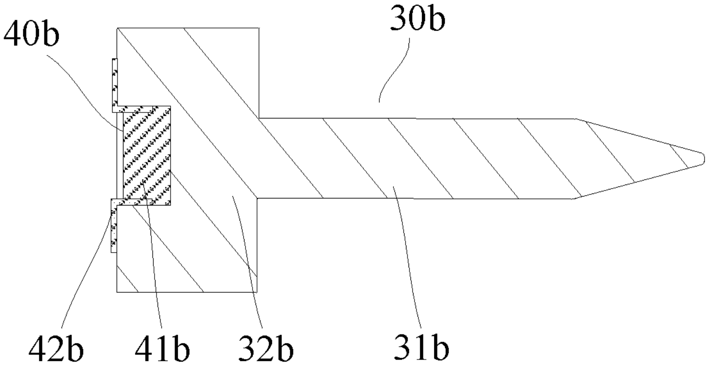
FIG. 6 is a sectional view of a susceptor integrated with a temperature sensor according to another embodiment.
Figure 7:
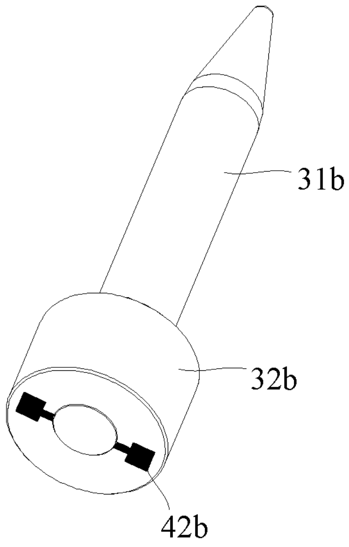
FIG. 7 is a perspective view of the susceptor integrated with a temperature sensor shown in FIG. 6.
Figure 8:
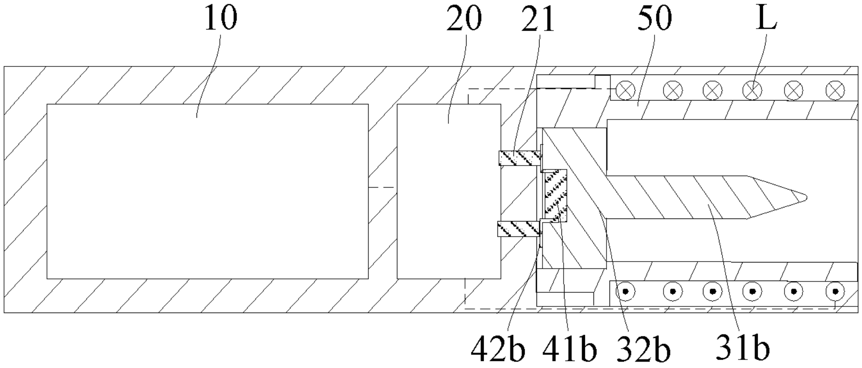
FIG. 8 is a diagram of an aerosol generation device including the susceptor shown in FIG. 6 according to one embodiment.

In another preferred embodiment of the present disclosure, a device is employed that integrates heat generation and temperature measurement by integrating the temperature sensor 40 and the susceptor 30 into one piece; specifically, referring to FIG. 6 to FIG. 8, the sensing portion 41*b* of the temperature sensor 40*b* is packaged within the base portion 32*b* of the susceptor 30*b*, while the electrical connection structure configured for supplying power to the sensing portion 41*b* employs the form of a sheet like electrical contact or an electrical contact piece 42 and is attached onto a surface of the base portion 32*b* by printing, deposition or etching. Correspondingly, the aerosol generation device is provided with a conductive pogo pin 21 extended out by way of welding or terminal; when the susceptor 30*b* is fixedly installed inside the tubular holder 50, the electrical contact or electrical contact piece 42 presses against the conductive pogo pin 21 to achieve power supply connection.

According to the preferred embodiment shown in FIG. 7, the electrical contact 42*b* is electrically insulated from the base portion 32*b* during usage; during preparation, the surface of the base portion 32*b* may be first processed by insulation, for example, surface oxidation or spraying and the like, to form an insulation layer of ceramic or oxide materials, then the sensing portion 41*b* is glued and packaged within the base portion 32*b*, and finally the electrical contact or electrical contact piece 42*b* that is electrically connected to the sensing portion 41*b* is formed by way of printing or attaching and the like; thus, stable electric conduction may be realized. Compared with the method of connecting the temperature sensor 40*b* to the circuit 20 by way of welding pins, the method to press against the pogo pin is more convenient in installation and substitution.

Alternatively, in other variant embodiments, the above electrical contact or electrical contact piece 42*b* may also be formed or bonded onto a side wall of the base portion 32*b*, correspondingly the conductive pogo pin 21 may be arranged to abut against the electrical contact or electrical contact piece 42 along the lateral direction.

Figure 9:
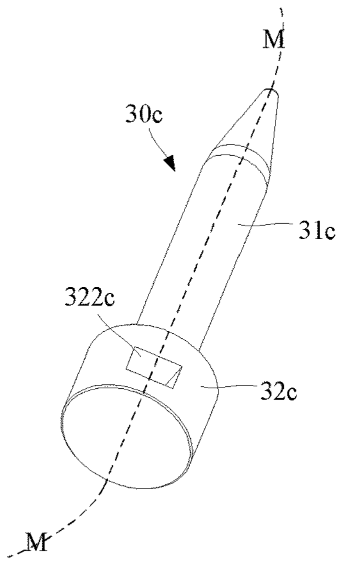
FIG. 9 is a perspective view of a susceptor according to another embodiment.

Alternatively, in other variant embodiments, based on further eliminating the effect of magnetic field interference during the sensing process of the temperature sensor 40, a hole may be opened on a side of the susceptor 30*c* to package the temperature sensor 40, as shown in FIG. 9; specifically, in FIG. 9, the base portion 32*c* of the susceptor 30*c* forms an accommodation space having a side wall opening 322*c* by way of holing on the side, so that the temperature sensor 40 may be packaged or accommodated within the susceptor 30*c* through the side wall opening 322*c*. The side wall opening 322 is deviated from the direction of the magnetic lines M of force of the magnetic field, so as to improve the effect of shielding or isolation between the accommodation space packaging the temperature sensor 40 and the magnetic field generated by the induction coil L that penetrates through the susceptor 30*c* along the axial direction.

Figure 10:
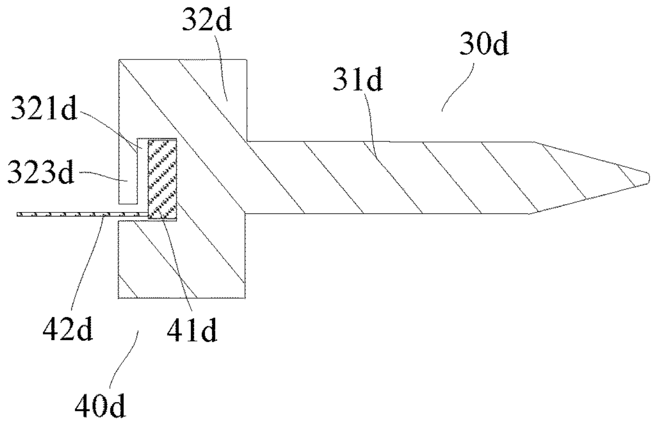
FIG. 10 is a sectional view of a susceptor integrated with a temperature sensor according to another embodiment.

For improving the effect of magnetic field interference during the process of sensing temperature, in another embodiment shown in FIG. 10, the base portion 32*d* of the susceptor 30*d* includes an internal accommodation space 321*d*; the sensing portion 41*d* of the temperature sensor 40*d* is packaged into the accommodation space 321*d* from an opening on the bottom of the base portion 32*d*, and the conductive pin 42*d* runs to outside of the susceptor 30*d* from the accommodation space 321*d* through the opening on the bottom surface; the base portion 32*d* further includes a shielding portion 322*d* at least partially shielding the accommodation space 321*d*, the shielding portion 322*d* extends along and within the cross section of the base portion 32*d*, thereby being perpendicular to the magnetic field penetrating the susceptor 30*c* along the axial direction, so that the accommodation space 321*d* is a space basically or substantially covered or enclosed by the shielding portion 322*d*, thus the accommodation space 321*d* basically is magnetically isolated or shielded.

Figure 11:
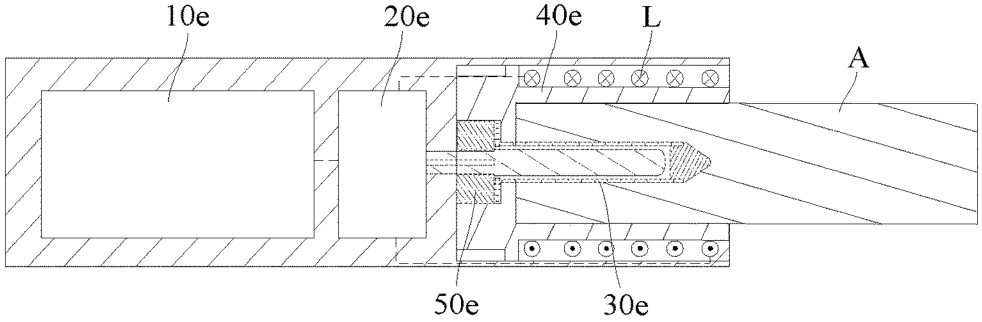
FIG. 11 is a structure diagram of an aerosol generation device according to one embodiment of the present disclosure.
Figure 12:
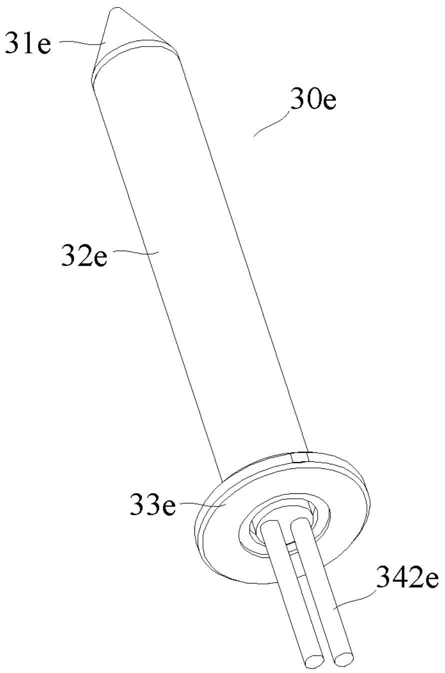
FIG. 12 is a perspective view of the susceptor shown in FIG. 11 from an angle of view.

The present disclosure further provides an aerosol generation device according to another preferred embodiment, whose structure can refer to FIG. 11 to FIG. 12. In the embodiment shown in FIG. 11, the aerosol generation device includes a tubular holder 40*e* configured for holding the induction coil L and the susceptor 30*e*, the material of the tubular holder 40*e* may include high temperature-resistant nonmetallic materials, for example, PEEK, or ceramic and the like. During implementation, the induction coil L is arranged on an outer wall of the tubular holder 40*e* in a spiral winding manner, and the tubular holder 40*e* is at least partially inside hollowed to form the chamber configured for receiving the smokable material A. The susceptor 30*e* presents a pin or needle shape that can be inserted into the interior of the smokable material A to heat the smokable material.

Meanwhile, in the preferred embodiment shown in FIG. 11, the tubular holder 40*e* is internally provided with a fixing seat 50*e*, which is configured to support or hold the susceptor 30*e*, so that the susceptor 30*e* can be stably held within the tubular holder 40*e*. During implementation, the fixing seat 50*e* may be made of high temperature-resistant silicone rubber, rubber and rigid polymer resin materials.

Figure 13:
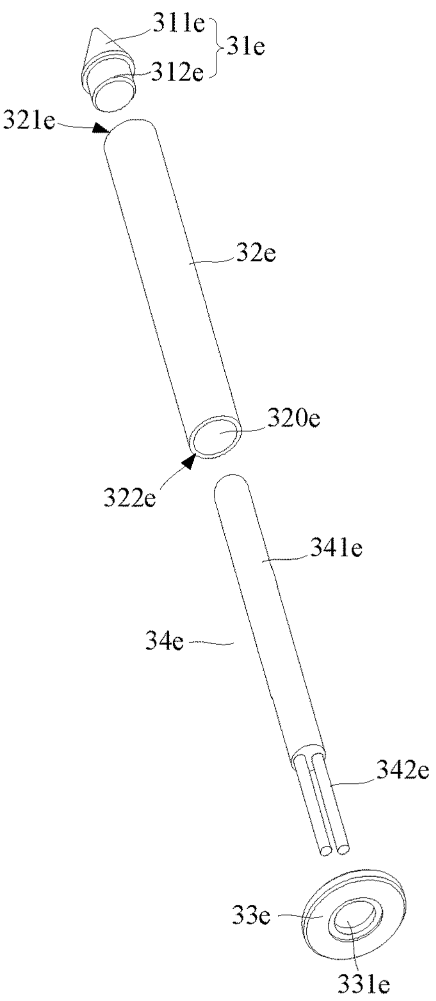
FIG. 13 is an exploded view of the susceptor shown in FIG. 11 before each part is assembled.
Figure 14:
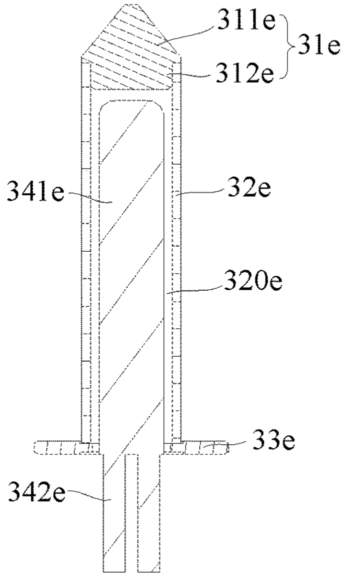
FIG. 14 is a sectional view of the susceptor shown in FIG. 12.

Further, referring to FIG. 12 to FIG. 14, the structure of the susceptor 30*e* includes a tubular element 32*e*; the tubular element 32*e* includes a hollow portion 320*e* located inside, and a first end 321*e* and a second end 322*e* that are opposite along the length direction, wherein the first end 321*e* is provided with a pinhead 31*e*, and the second end is provided with a sheet like end cover 33*e;* the sensing portion 341*e* of the temperature sensor 34*e* is accommodated and packaged in the hollow portion 320*e* of the tubular element 32*e*; to facilitate power supply and reception of sensing signals, the conductive pin 342*e* of the temperature sensor 34*e* runs to outside of the sheet like end cover 33*e* to electrically connect to the circuit 20*e*. After the sensing portion 341*e* of the temperature sensor 34*e* is tightly pressed against an inner wall of the hollow portion 320*e*, a high-temperature glue may be applied to seal, fill or pad the remaining gap, so that the sensing portion 341*e* of the temperature sensor 34*e* is stably fixed and is in tight contact with the inner wall of the tubular element 32.

In an optional embodiment, the tubular element 32*e* is made of 5430 stainless steel and has an inner diameter of about 2.5 to 4 mm and a tube wall thickness of 0.15 to 0.3 mm, which is easy to process and obtain. The space size of the internal hollow portion 320*e* is enough to accommodate the sensing portion 341*e* of the temperature sensor 34*e* with a size less of about 3.8 mm. Moreover, after the internal hollow portion 320*e* accommodates and packages the sensing portion 341*e* of the temperature sensor 34*e*, the internal hollow portion has proper gap left for applying or injecting glue, so that the temperature sensor 34*e* is fixed.

It is more preferable that a preferred embodiment based on skin effect employs a susceptor thickness of about 2 mil (one mil=0.025 mm) under an alternating magnetic field of about 400 KHz, in which case the susceptor can rise from a room temperature to a temperature of 500° C. within 2 s under a power of about 4.5 W; then, in a preferred embodiment, the tube wall thickness of the tubular element 32*e* preferably employs a lowest possible thickness easy to prepare, such as 0.15 mm, which is suitable for the heating effect of electromagnetic induction type heating.

Figure 15:
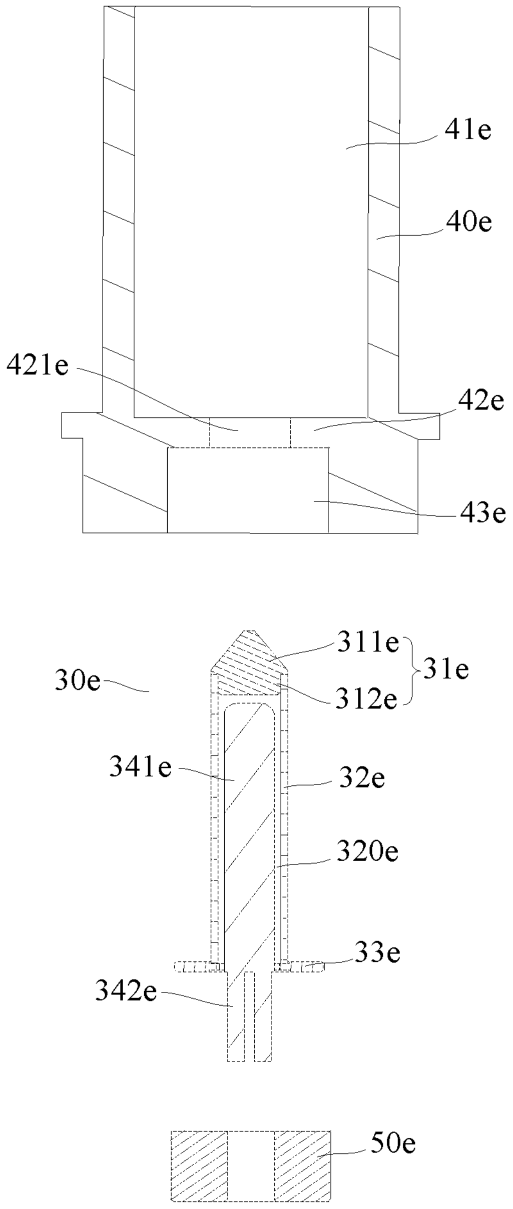
FIG. 15 is an exploded sectional view of the susceptor shown in FIG. 14 before each part is assembled.

Further, in preferred embodiments shown in FIG. 13 to FIG. 15, the pinhead 31*e* includes a conical portion 311*e* which decreases gradually in outer diameter or a pointed end portion; the conical portion 311*e* enables the pinhead 31*e* to be smoothly inserted into the smokable material A. The pinhead 31*e* further includes a connection portion 312*e* extended out from the conical portion 311*e* along the axial direction; the connection portion 312*e* presents a cylindrical shape and is extended into the hollow portion 320*e* from the first end 321*e* of the tubular element 32*e* after being installed; further, the pinhead 31*e* is fixedly connected to the tubular element 32*e* at the first end 321*e* through interference or tight fit and the like.

Further, during implementation, both of the pinhead 31*e* and the tubular element 32*e* are made of metal or alloy materials with good magnetic conductivity, so that they can be penetrated by the alternating magnetic field generated by the induction coil L to generate heat, thereby heating the smokable material A. Specifically, they may be made of Grade 430 stainless steel (SS430), or alloy materials containing iron and nickel (for example, J85/J66 permalloy). Thus, during implementation, the sensing portion 341*e* of the temperature sensor 34*e* may be arranged close to the pinhead 32*e* at the top end within the tubular element 32*e*, so that the temperature sensed when the pinhead 31*e* and the tubular element 32*e* generate heat together is the overall temperature of the pinhead 31*e* and the tubular element 32*e*, and the result is more accurate and stable.

The sheet like end cover 33*e* is mainly configured for providing support and fixing for the tubular element 32*e* and the internal temperature sensor 34*e* and facilitating the stable bonding between the susceptor 30*e* and the tubular holder 40*e* and the fixing seat 50*e*; the sheet like end cover 33*e* is made of heat-resistant PEEK materials, or non-magnetized metals such as aluminum alloy or ceramic and the like. In the preferred embodiment shown in FIG. 13, the sheet like end cover 33*e* includes a through hole 331*e* used for the conductive pin 342*e* of the temperature sensor 34*e* to run through to outside to electrically connect to the circuit 20*e*. During implementation, since the sensing portion 341*e* of the temperature sensor 34*e* is tightly held and fixed within the hollow portion 320*e* by application of glue, the size of the through hole 331*e* may be larger than the size of the inner diameter of the tubular element 32*e*, in which case the sensing portion 341*e* of the temperature sensor 34*e* will not loosen or fall off from the through hole 331*e*.

Figure 17:
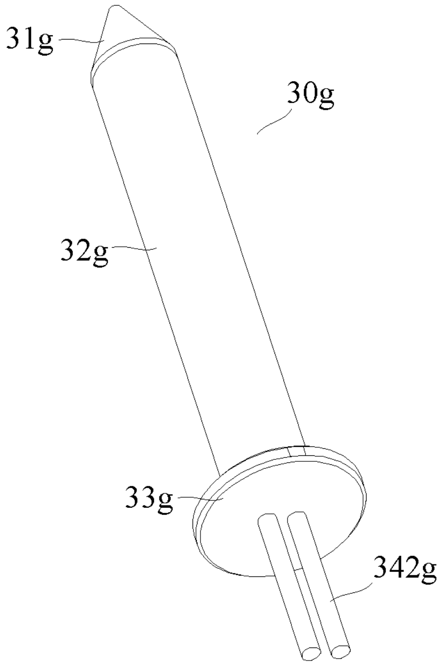
FIG. 17 is a perspective view of the susceptor according to another embodiment.

In a preferred embodiment, as shown in FIG. 17, the sheet like end cover 33*g* is made of the above preferred non-magnetized metals such as aluminum alloy, and only reserves an aperture for the conductive pin 342 to run through, so that the hollow portion 320*e* is substantially or basically enclosed by the pinhead 31*g*, the tubular element 32*g* and the sheet like end cover 33*g* that are made of metallic materials; such design aims to form a magnetically isolated or shielded space inside the hollow portion 320*e* as much as possible, thereby being capable of effectively preventing the sensing portion 341 made of a thermosensitive metallic material being impacted by a magnetic field during the temperature measurement process.

Further, the fixing structure for the susceptor 30*e* can refer to FIG. 15; the tubular holder 40*e* is internally provided with a separation portion 42*e* extending along a radial direction; the separation portion 42*e* separates the inner space of the tubular holder 40*e* into a first chamber 41*e* and a second chamber 43*e* which are located at two sides of the separation portion 42*e*; wherein the first chamber 41*e* is configured as a receiving chamber to receive the smokable material A, and the second chamber 43*e* is configured for fixing the susceptor 30*e*.

Specifically, the separation portion 42*e* defines a perforation 421*e* for the susceptor 30*e* to run through from the second chamber 43*e* to the first chamber 41*e*; during installation, an upper surface of the sheet like end cover 33*e* of the susceptor 30*e* abuts against the separation portion 42*e*, and a lower surface of the sheet like end cover 33*e* is further pressed against by the fixing seat 50*e* in tight fit with the second chamber 43*e*, so that the susceptor 30*e* is stably installed within the tubular holder 40*e*, referring to FIG. 11. Of course, in preferred embodiments shown in FIG. 11 and FIG. 15, the fixing seat 50*e* presents a ring shape, and after assembly, the conductive pin 342*e* of the temperature sensor 34*e* runs through the fixing seat 50*e* to outside to electrically connect to the circuit 20*e*.

Figure 16:
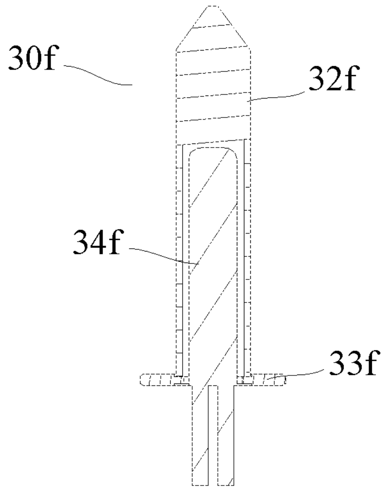
FIG. 16 is a sectional view of the susceptor according to another embodiment.

Or, in an optional variant embodiment, the pinhead 31*e* and the tubular element 32*e* are a one-piece pin structure directly formed by mold shaping, rather than a combination of two parts shown in FIG. 11 to FIG. 15. Specifically, referring to FIG. 16, the susceptor 30*f* includes a main body portion 32*f* of a pin like structure, whose front end is a pointed end that can be easily inserted into the smokable material A and whose interior forms a hollow extending along the axial direction by way of mold or holing and the like, so that the sensing portion of the temperature sensor 34*f* can be accommodated and packaged within the main body portion 32*f* and is fixed and held through one sheet like end cover 33*f*.

In the aerosol generation device provided by the present disclosure, the temperature sensor is packaged or accommodated within the susceptor, the effect of a magnetic field on the sensing portion can be substantially isolated, and the susceptor and the temperature sensor can be integrated into one piece, improving the stability of installation and the accuracy of temperature measurement, and also facilitating replacement and installation as a whole.

It is to be noted that the description of the present disclosure and the drawings just list preferred embodiments of the present disclosure and are not limited to the embodiments described herein. Further, for the ordinary staff in this field, improvements or variations may be made according to the above description, and all these improvements or variations are intended to be included within the scope of protection of the claims appended hereinafter.

What is claimed is:

1. An aerosol generation device, configured to heat a smokable material to generate an aerosol, comprising:

a chamber, which is configured to receive a smokable material;

a magnetic field generator, which is configured to generate a varying magnetic field;

a susceptor, which is configured to be penetrated by the varying magnetic field to generate heat, so as to heat the smokable material received in the chamber;

a circuit; and a temperature sensor, comprising:

a sensing portion, which is packaged or accommodated within the susceptor and is configured to sense a temperature of the susceptor; and an electrical connection portion connected to the sensing portion, which is at least partially located outside the susceptor and is electrically connected to the circuit, and through which the circuit can receive the temperature sensed by the sensing portion;

wherein the susceptor comprises a main body portion of a pin, needle, or blade like structure, the main body forms a hollow in an interior, the hollow extends along an axial direction of the main body, and the sensing portion of the temperature sensor is accommodated within the hollow of the main body.

2. The aerosol generation device according to claim 1, wherein the hollow is isolated from the varying magnetic field.

3. The aerosol generation device according to claim 2, wherein the susceptor includes an opening defined on a surface thereof, and the sensing portion is packaged or accommodated within the hollow through the opening; the opening is deviated from the direction in which the varying magnetic field penetrates through the susceptor, so that the hollow is isolated from the varying magnetic field.

4. The aerosol generation device according to claim 2, wherein the hollow is completely covered or enclosed by the surface of the susceptor, so that the hollow is isolated from the varying magnetic field.

5. The aerosol generation device according to claim 1, further comprising an elastomer, which is configured to provide an elastic force, so that the sensing portion is stably packaged or accommodated within the accommodation space.

6. The aerosol generation device according to claim 1, wherein the electrical connection portion comprises an elongated conductive pin.

7. The aerosol generation device according to claim 1, wherein the electrical connection portion comprises an electrical contact or electrical contact piece formed or bonded onto the surface of the susceptor.

8. The aerosol generation device according to claim 7, wherein the electrical contact is an electrical contact formed by printing, deposition or etching.

9. The aerosol generation device according to claim 7, wherein the electrical contact is insulated from the susceptor.

10. The aerosol generation device according to claim 7, further comprising a conductive mechanism, one end of which abuts against the electrical contact or electrical contact piece and the other end is electrically connected to the circuit, so that the electrical contact or electrical contact piece is electrically connected to the circuit.

11. The aerosol generation device according to claim 7, wherein the susceptor comprises a pin, needle or sheet like heating portion extending at least in part along an axial direction of the chamber, and a base portion connected to the heating portion;

the hollow is formed inside the base portion; and/or, the electrical contact or electrical contact piece is formed or bonded onto a surface of the base portion.

12. The aerosol generation device according to claim 1, wherein the susceptor comprises:

a tubular element, extending along the axial direction of the chamber, at least part of an inner space of the tubular element forming the hollow; the tubular element comprises opposite first end and second end;

the first end is provided with a pinhead and is configured to be able to be inserted into the smokable material received in the chamber; and the electrical connection portion of the temperature sensor runs through the second end to outside of the susceptor from the hollow.

13. The aerosol generation device according to claim 12, wherein the pinhead comprises:

a connection portion, which is constructed as a cylindrical shape and is at least partially accommodated within the tubular element from the first end; and a conical portion, which is constructed as abutting onto the first end and decreases gradually in outer diameter along a direction away from the first end.

14. The aerosol generation device according to claim 12, wherein the susceptor further comprises:

a sheet like end cover, which is arranged on the second end of the tubular element and extends along a cross-sectional direction of the tubular element; and the sheet like end cover defines a perforation for the electrical connection portion of the temperature sensor to run through.

15. The aerosol generation device according to claim 14, wherein the aerosol generation device further comprises a tubular holder; inside the tubular holder is arranged a separation portion extending along a radial direction, and an inner space of the holder is separated, through the separation portion, into a first portion and a second portion which are located at two sides of the separation portion, wherein the first portion is configured as a chamber to receive a smokable material;

the tubular element of the susceptor runs to inside of the chamber from the second portion through a through hole on the separation portion; the sheet like end cover of the susceptor is accommodated within the second portion and abuts on the separation portion, so that the susceptor is kept fixed inside the holder.

16. The aerosol generation device according to claim 15, wherein a fixing seat is further arranged inside the second portion, the fixing seat is configured to provide support for the sheet like end cover, so that the sheet like end cover abuts on the separation portion.

17. The aerosol generation device according to claim 14, wherein the hollow is completely covered or enclosed by the pinhead, the tubular element and the sheet like end cover, so that the hollow is isolated from the varying magnetic field.

18. A susceptor for an aerosol generation device, the susceptor being configured to be penetrated by a varying magnetic field to generate heat, so as to heat a smokable material, wherein the susceptor comprises: a metal main body penetrated by a varying magnetic field to generate heat; and a temperature sensor, comprising:

a sensing portion, which is packaged or accommodated within the metal main body and is configured to sense a temperature of the metal main body; and an electrical connection portion connected to the sensing portion, which is at least partially located outside the metal main body, and through which the temperature of the metal main body sensed by the sensing portion can be received;

wherein the metal main body comprises a pin, needle, or blade like structure, the metal main body forms a hollow in an interior, the hollow extends along an axial direction of the metal main body, and the sensing portion of the temperature sensor is accommodated within the hollow of the metal main body.

19. The susceptor for the aerosol generation device according to claim 18, wherein the electrical connection portion comprises an electrical contact or electrical contact piece formed or bonded onto a surface of the metal main body.

* * * * *